March 26, 1963 R. N. LEVINN 3,083,283
TEMPERATURE CONTROL ATTACHMENT FOR A UTENSIL
Filed July 26, 1960 2 Sheets-Sheet 1
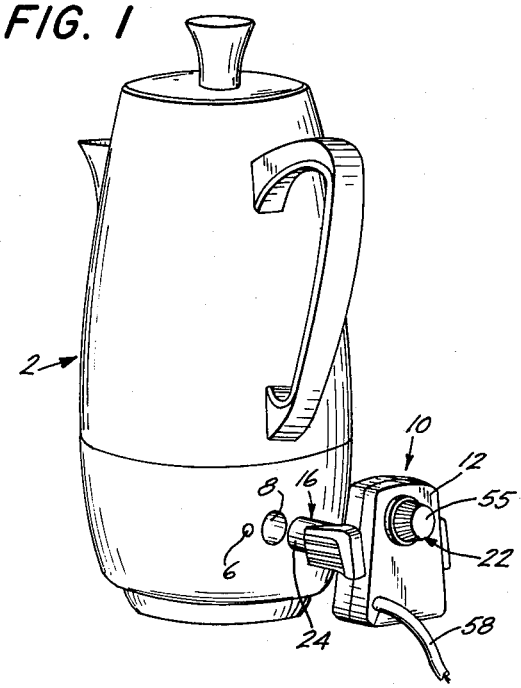
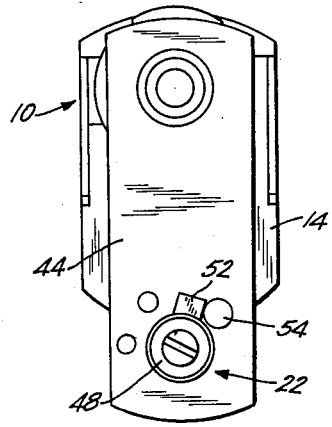
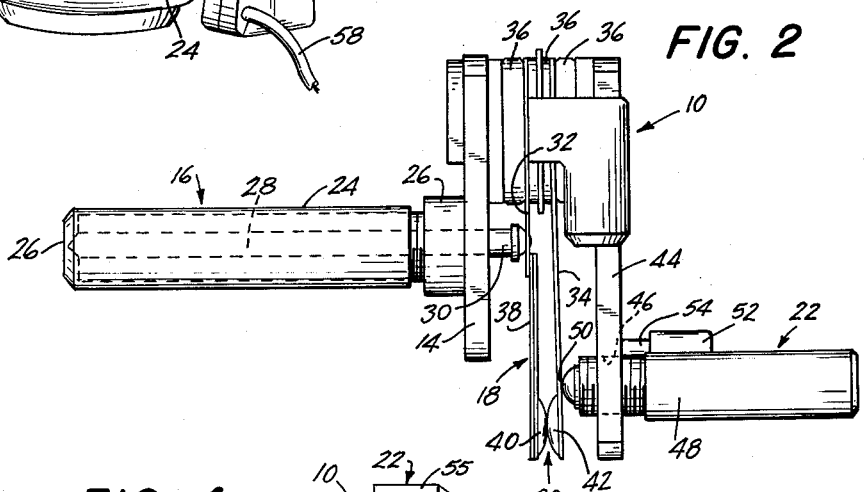
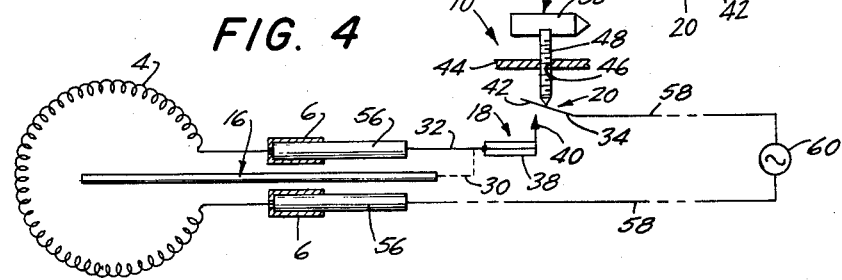
INVENTOR.
ROBERT N. LEVINN
BY
ATTORNEYS March 26, 1963 R. N. LEVINN 3,083,283
TEMPERATURE CONTROL ATTACHMENT FOR A UTENSIL
Filed July 26, 1960 2 Sheets-Sheet 2

INVENTOR.
ROBERT N. LEVINN
BY
ATTORNEYS

United States Patent Office 3,083,283
Patented Mar. 26, 1963

3,083,283
TEMPERATURE CONTROL ATTACHMENT
FOR A UTENSIL
Robert N. Levinn, Catskill, N.Y., assignor to American
Thermostat Corporation, South Cairo, N.Y., a corporation of New York
Filed July 26, 1960, Ser. No. 46,869
2 Claims. (Cl. 200—136.5)

The present invention relates to a system for adjustably controlling the temperature of an electrically heated device such as a cooking utensil. The invention is here specifically disclosed as embodied in controls for an electric percolator, and it is exceptionally well suited for that purpose, but its range of applicability is not limited thereto.

One problem common in most devices of the type under discussion is to attain a given temperature promptly and then maintain that temperature with as high a degree of accuracy as possible. This is conventionally accomplished by placing a thermostatically actuated switch in the electric circuit to the heating element of the device, that switch being closed, thereby to cause the heating element of the device to be energized, until such time as the desired temperature is reached, the switch thereafter opening so as to prevent overheating of the utensil. With heating cut off the utensil cools down somewhat, the switch again closes, heat is again supplied to the utensil causing its temperature to rise, the switch opens, and so on. The same thermostat sensitive to the utensil temperature is used to control the time when the initial heating cycle terminates—when the utensil first comes up to its desired temperature—and to control the subsequent intermittent actuation of the heating element to maintain the utensil at the desired temperature. Not only initial heating, but also the maintenance of the utensil at the desired temperature is therefore controlled in accordance with the actual temperature of the utensil.

Inescapable and inherent in this conventional type of control is a variation in the temperature of the utensil after it has reached the predetermined value. Various expedients have been employed in an attempt to minimize this temperature variation. These expedients have been successful to varying degrees, but some appreciable and sensible temperature change in the utensil is nevertheless unavoidable with the system of the prior art.

The inherent inaccuracies of these systems is further complicated by what may be considered the thermal inertia of the systems. Heat will continue to be supplied to the utensil for some period after the heating element has been de-energized, so that the actual maximum temperature to which the utensil is subjected is somewhat greater than that which causes the thermostatic switch to open the heating circuit. Moreover the utensil will continue to cool down for a short period after the heating device has been re-energized. The range of fluctuation of the utensil temperature is therefore necessarily somewhat greater than the temperature differential which causes the thermostat to open and close the circuit of the heating device.

One approach to the objective of keeping the temperature fluctuation of the utensil to a minimum is to utilize a highly sensitive thermostatic switch, with a minimal temperature difference required to actuate the switch between closed and open positions. However, the more sensitive the thermostat, the smaller is the range of temperature over which it may be controllingly adjusted as a general rule. A switch which is capable of controlling the temperature of a utensil over a wide range, as, for example, between a percolating temperature and a frying temperature, will not be capable of maintaining the utensil temperature closely uniform at any given setting, and conversely, a thermostat which can minimize the temperature drift of the utensil at a given setting will not also be capable of effectively controlling temperatures over a wide range.

The prime object of the present invention is to provide a system and mechanism for limiting, to a degree heretofore not considered capable of attainment under practical conditions, the range of temperature variation of a heated utensil after it has reached a predetermined temperature level.

A further prime object of the present invention is to provide system and apparatus which is capable of controlling over an exceptionally wide range the temperature to which a utensil may be heated and for accurately maintaining that utensil at a predetermined value of temperature within that range.

Yet another prime object of the present invention is to provide a system and apparatus for controlling the heating of a utensil so as to accurately terminate that heating when the temperature of that utensil has reached a predetermined value, and thereafter to control the maintenance of the temperature of the utensil at that predetermined value, the heating termination and temperature maintenance each being achieved in a way best suited thereto.

These results are accomplished by utilizing two separate controlling instrumentalities, one primarily controlling the initial termination of the heating operation when the temperature of the utensil has reached a predetermined value, and the other then normally taking over and controlling the maintenance of that predetermined temperature of the keeping warm of the contents of the utensil, as may be desired. The first instrumentality nevertheless provides an overriding control in the event that the utensil temperature should depart from its desired value.

The first instrumentality is specifically disclosed as a means which is directly affected by the temperature of the utensil and which is therefore operatively connected to that utensil in intimate heat-transfer relation thereto. The second instrumentality, which controls the on-and-off cycling of the heating device in order to maintain the temperature of the utensil at the predetermined value, is specifically disclosed as a means which is sensitive to the energization of the heating unit per se. As here specifically disclosed, it senses the length of time that the heating element is energized, as by being thermostatically affected by the current flow to that heater. In the form here specifically illustrated, the actuation of the switch in the heater circuit between open and closed positions is dependent upon the simultaneous action of both of the instrumentalities above referred to, the temperature sensing device initially controlling the actuation of the switch almost exclusively, the current-sensing device thereafter taking over control, for so long as the utensil temperature is maintained within desired limits.

As a result, once the utensil has come up to predetermined temperature its on-and-off cycling to maintain that temperature is controlled without requiring any appreciable change in that temperature. Thus, the temperature of the utensil is accurately maintained at a substantially uniform value. Variation of that temperature is neither necessary nor desirable.

In the structure here specifically disclosed the current-sensing device has a movable part which directly actuates the switch in the heater circuit. The temperature-sensing device, which dictates the attained temperature of the utensil, controls the position of the current-sensing device, and hence contributes to the position of the movable part of the current- sensing device. The current-sensing device is subject to an ambient temperature other than that of the utensil (but nevertheless related thereto), so that its current-sensing function is substantially independent of the utensil temperature and is specially designed for accurate maintenance of said utensil temperature.

When the utensil is cold, the temperature-sensing device so locates the current-sensing device that it alone is ineffective to open the heater switch. When the temperature of the utensil reaches a predetermined value, the temperature-sensing device will be so actuated as to cause the switch to open. At this time the current-sensing device will be in its fully actuated position. When the switch opens, current flow to the heater stops and the current sensing device tends to return to its normal position. In so doing it closes the heater switch, the heater is again energized, and the current-sensing device is correspondingly actuated so as, after a predetermined period of time, depending upon the amount of current flow, to open the circuit again. The devices are so correlated that the on-and-off cycling of the heater after the utensil has reached its predetermined temperature occurs with substantially no change in the temperature of the utensil. Of course, if the temperature of the utensil should change, as if some cold object or substance were placed therein, the temperature sensing device would take over control and insure that the heater is energized until the predetermined temperature is once again attained.

An exceptionally simple and easily manufactured structural assembly is here specifically disclosed, in which both sensing devices and the switch are mounted in a control unit housing adapted to be detachably secured to the utensil. The temperature sensing device is in the form of a probe adapted to penetrate the utensil and thus be in intimate heat-transfer relationship therewith. The current sensing device is a bi-metal thermostat through which the heating current passes. In one embodiment the probe, as it expands and contracts in accordance with the sensed utensil temperature, mechanically positions the bi-metal, and the bending of the bi-metal in accordance with the passage of current therethrough is super-imposed upon the positioning action of the probe. In a second embodiment the probe serves to conduct heat between the utensil and the interior of the control unit housing, thereby determining the ambient temperature in said housing, and hence the bending of the bi-metal, in accordance with the temperature of the utensil. The maximum amount which the bi-metal will bend is limited, to the end that the probe provides a control action capable of over-riding the control action of the bi-metal which senses the current flow.

To the accomplishment of the above, and to such other objects as may hereinafter appear, the present invention relates to system and apparatus for controlling the energization of a heater in a utensil or the like, as defined in the appended claims, and as described in this specification, taken together with the accompanying drawings, in which:

FIG. 1 is a three-quarter perspective view of an electric percolator provided with a detachably secured attachment which carries the elements of the present invention;

FIG. 2 is a side elevational view of the structure of one embodiment of that attachment, the external housing and male contact elements being eliminated for purposes of clarity;

FIG. 3 is a top plan view of the assembly of FIG. 2;

FIG. 4 is a circuit diagram of the parts of the system; and

Figure 5:
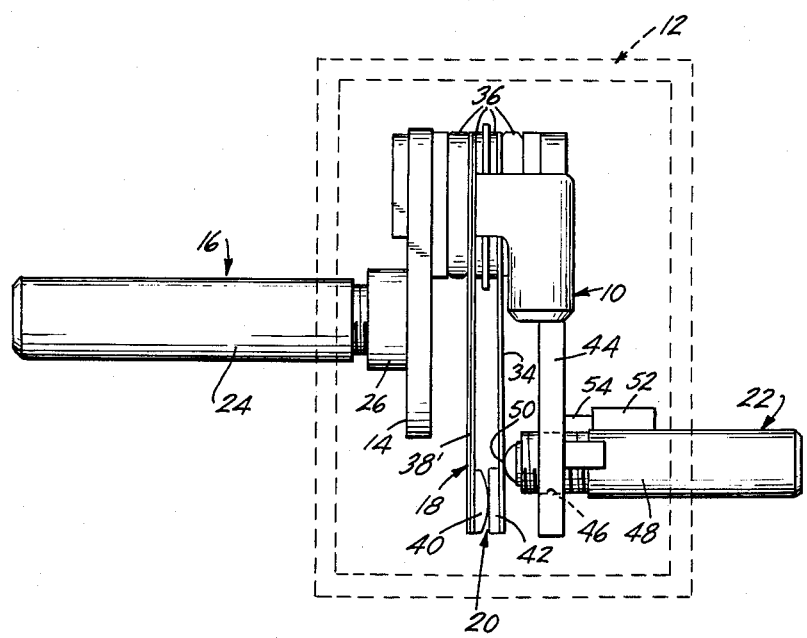
FIG. 5 is a view similar to FIG. 2 but showing a simplified embodiment, the external housing being shown in phantom.

The invention is here specifically disclosed for purposes of exemplification for use with a utensil in the form of an electrically heated coffee percolator generally designated 2, that utensil containing, sealed within the base thereof, a heating coil 4 the ends of which are electrically connected to sockets 6 exposed at the outside of the percolator body. An aperture 8 is provided in the percolator body between the sockets 6, the inner surface of the aperture 8 being in intimate heat-transfer relationship with the interior of the percolator body.

The system and apparatus of the present invention for controlling the energization of the heating coil 4 and hence the temperature of the interior of the utensil 2 and the contents thereof, is housed within or carried by an attachment generally designated 10, that attachment comprising an outer housing shell 12 within which a mounting plate 14 is secured in any appropriate manner. On this mounting plate 14 are mounted a device generally designated 16 for sensing the temperature of the interior of the utensil 2, a device generally designated 18 for sensing the current flow in the heating coil circuit, a switch designated 20 for opening and closing that heating coil circuit, and manually actuated means 22 for adjusting the device to function at a predetermined temperature.

The temperature sensing device 16 is in the form of a probe which extends out forwardly from the mounting plate 14 and beyond the front wall of the housing 12 and is snugly receivable within the aperture 8 in the utensil 2 when the attachment 10 is secured to the utensil 2, thereby to sense and to be affected by the temperature of the interior of the utensil 2 and its contents.

In the embodiment of FIGS. 2 and 3, which will now be described in detail, the probe 16 comprises an outer tube 24 threadedly received in a flange 26 forming a part of the mounting plate 14, that tube 24 being of material having a relatively high thermal co-efficient of expansion. Within the tube 24 and resting on the closed end wall 26 thereof is a rod 28, preferably formed of material having a minimal thermal co-efficient of expansion, the inner end 30 of that rod extending freely through the mounting plate 14, as may clearly be seen from FIG. 2.

A short resilient arm 32 and a long resilient arm 34 are mounted on plate 14, being separated therefrom and from one another by insulating washers 36. These arms are formed of conductive resilient material. The short arm 32 overlies and is engaged by the end 30 of the probe rod 28, being tensioned in that engagement so as to press the probe rod 30 to the left as viewed in FIG. 2 against the end wall 26 of the probe tube 24. The arm 32 carries at its free end a bi-metal strip 38, the two layers of which, as is conventional, have different thermal co-efficients of expansion so that the strip 38 will bend when it is heated. Its direction of bending when heated is toward the plate 14. At least one of the layers of the strip 38 is conductive and appreciably resistive so that the passage of current therethrough will generate an appreciable amount of heat. The bi-metal strip 18 underlies the long resilient arm 34, and the strip 38 and the arm 34 carry contacts 40 and 42 respectively which are adapted to engage and disengage and which comprise the switch 20.

A structural member 44 overlies the arm 34 and is provided with an internally tapped aperture 46 within which adjustment shaft 48 is threadedly received, the left-hand end 50 of the shaft 48 engaging the arm 34. The tip 50 is preferably formed of an electrical insulating material. The shaft 48 is provided with a protruding lug 52 adapted to cooperate with a pin 54 extending up from the structural member 44 in order to limit the rotation of the shaft 48. An adjustment knob 56 on the exterior of the housing 12 is operatively connected to the shaft 48 so that the latter may be rotated. As it is rotated it moves in and out relative to the member 44 (to the left and right as viewed in FIG. 2) thereby to vary the positioning or the bias on arm 34 and the contact 42 carried thereby, in conventional manner. The housing 12 also carries male contact elements 56 (see FIG. 3) adapted to be received within the socket terminals 6 of the utensil 2 when the attachment 10 is secured in place.

The parts are electrically connected as shown in FIG.

4. A pair of wires 58 adapted to be connected to any suitable external source of electric power 60 extend from the housing 12. One of those wires is connected directly to one of the male contact elements 56. The other wire 58 is electrically connected to conductive arm 34 which carries the contact 42. The contact 40 is electrically connected via bi-metal strip 38 and the flexible conductive arm 32 to the other male terminal element 56.

The device functions as follows: the attachment 10 is secured to the utensil 2, with the probe 16 penetrating the utensil 2 by entering the aperture 8 and with the male contact members 56 entering and electrically engaging the socket terminals 6. The adjusting knob 55 is rotated to a pre-determined position corresponding to the temperature desired in the utensil 2. When the wires 58 are connected to the external electrical source 60, a circuit is completed through the switch 20 to the heating coil 4 within the utensil 2, and heating of that utensil will take place. As the temperature of the utensil rises the probe 16, in intimate heat-transfer engagement therewith, will be actuated, the tube 24 thereof elongating, thus causing the rod 28 thereof to move to the left as viewed in FIG. 2. At the same time the passage of current through the bi-metal strip 38 will cause that strip to bend so that its free end tends to move to the left as viewed in FIG. 2. The movement of the probe rod 28 to the left will permit the bi-metal strip 38, urged by the arm 32, to move bodily in the same direction, carrying its contact 40 along with it and away from the contact 42, and the bending of the strip 38 will also act to move the contact 40 away from the contact 42. The contact 42 will, however, at least initially, remain in engagement with the contact 40 by virtue of the positioning and biasing of the latter by the adjusting shaft 48.

It must be borne in mind that the thermostatic strip 38 is subjected to the ambient temperature of the interior of the housing 12, which temperature is considerably below the temperature of the interior of the utensil 2, and which temperature remains substantially constant independently of small variations in the temperature of the utensil 2 once the utensil 2 has come up to temperature and the interior of the housing 12 has come into thermal equilibrium therewith. Hence the heat generated in the bi-metal strip 38 while current passes through is rather readily dissipated therefrom, and substantially uniformly for all temperatures of the utensil 2. In the specific embodiment here disclosed, when the temperature of the bi-metal strip 38 exceeds that of the ambient temperature inside the housing 12 by a comparatively small amount, on the order of 5° F., heat will be generated therein by the passage of current therethrough at the same rate as heat is dissipated therefrom and its temperature will remain constant as the current flow continues. Since the amount which the strip 38 bends is dependent upon its temperature, it will be seen that the strip 38 will bend a certain amount corresponding to that differential over and above the ambient temperature within the housing 12, after which it will bend no further despite the fact that current continues to flow therethrough.

For so long as current continues to flow through the heating coil 4, the temperature of the utensil 2 will continue to rise and the probe 16 will continue to expand. Eventually, when the temperature of the utensil has reached a predetermined value corresponding to the setting of the manual adjusting knob 55, the probe 16 will have expanded sufficiently to permit the resiliency of the short arm 32, together with the bending of the bi-metal strip 38, to move the contact 40 away from the contact 42. This will open the circuit to the heating coil 4.

When this occurs current will no longer flow through the bi-metal strip 38, heat will no longer be generated therein, the strip 38 will commence to cool, and it will bend back toward the right carrying its contact 40 along with it. Because of the relatively small temperature differential between the bi-metal strip 38 and the ambient temperature within the housing 12 this cooling effect will be fairly slow, but nevertheless much more rapid than the cooling-off of the utensil 2 itself. When the strip 38 will have cooled and bent to the right sufficiently to bring the contact 40 again into engagement with the contact 42, the circuit to the heating coil 34 will be re-established. Current will again flow therethrough, providing additional heat to the utensil 2, and the flow of current through the strip 38 will cause that strip to heat and bend again to the left, separating the contacts 40 and 42 and opening the heating coil circuit. In a typical embodiment, once the predetermined temperature of the utensil has been reached the cycling effect produced by the bi-metal strip 38 will provide for a twenty second open-circuit condition and a two-second closed-circuit condition in a typical percolator application. This type of cycling will be sufficient to maintain the temperature of the utensil itself virtually constant, all other conditions being unchanged, so that the relatively insensitive probe 16, which senses the temperature of the utensil 2, will undergo no appreciable expansion or contraction.

Thus it will be seen that the device 16 which senses the temperature of the utensil provides what might be considered the primary control over the actuation of the switch 20 and the energization of the heating coil 4, but once it has done its task the maintenance of the utensil at its predetermined temperature is accomplished by the current-sensing device 18 defined by the current-carrying bi-metal strip 38 as here disclosed.

If there should be some change in the temperature of the utensil 2, as if some of its contents were to be removed or cool water were to be poured thereinto, that temperature change would be detected by the probe 16, and the probe would then take over its primary control function, actuating the switch 20 in an appropriate sense so as to bring the temperature back to the value determined by the setting of the adjustment knob 55, after which the bi-metal strip 38 would take over its cycling temperature-maintaining function.

The embodiment disclosed in FIG. 5 is a somewhat simplified and less costly version of the embodiment of FIGS. 2 and 3, and is in general similar thereto in construction, similar reference numerals being applied to comparable parts. It differs from the embodiment of FIGS. 2 and 3 primarily in that the probe 16 is not mechanically connected to the switch 20, but is instead thermally connected thereto via the ambient temperature inside the housing 12. To that end the rod 38 which is received within the tube 24 in the embodiment of FIGS. 2 and 3 is eliminated in the embodiment of FIG. 5, and the thermal coefficient of expansion of the tube 24 plays no part in the operation of the device. The tube 24 serves only to conduct heat from the utensil 2 to the interior of the housing 12, thereby to control in large part the ambient temperature within that housing in accordance with the temperature of the utensil. This ambient temperature, which is related to, but considerably less than, the temperature of the utensil 2, will thermostatically effect the bi-metal strip 38', that strip also being thermostatically affected by the current which flows therethrough when the switch 20 is closed. As specifically disclosed in FIG. 5 the bi-metal strip 38' extends all the way to the insulating washers 36, the short resilient arm 32 of the embodiment of FIG. 2 being eliminated.

The embodiment of FIG. 5 functions in substantially the same manner as the embodiment of FIGS. 2 and 3, but somewhat less precisely. This lack of precision is offset by its lesser expense. When the heating of the utensil commences the ambient temperature within the housing 12 is relatively low, and the bi-metal strip 38' closes the switch 20 and keeps that switch closed. Although current flows through the bi-metal strip 38', the heat generated thereby readily dissipates because of the comparatively low ambient temperature within the housing 12, so that the switch 20 remains closed. As the utensil 2 heats up the probe 16 is affected thereby and conducts heat to the interior of the housing 12, thus increasing the ambient temperature thereof. Eventually, when the utensil has reached its desired temperature, the ambient temperature within the housing 12 will be such, in conjunction with the heating effect produced by the passage of current through the bi-metal strip 38', as to cause the switch 20 to open, interrupting current flow to the heater 4. The temperature of the utensil will remain substantially constant, and so will the ambient temperature within the housing 12. The loss of current-produced heat within the bi-metal strip 38' will cause that strip to bend back and close the switch 20, current will flow through the strip 38' to heat it up and open the switch 20, and so on, in desired timed relationship. The cycling of the switch 20 after the utensil 2 has come up to temperature is accomplished substantially independently of the temperature of the utensil 2, and that utensil temperature remains substantially constant. It requires the overriding action of the temperature of the utensil 2, as sensed by the probe 16 and transmitted to the bi-metallic strip 38' via the air-filled space within the housing 12, to determine when the on- and off-cycling effect takes place.

Thus the primary difference between the embodiment of FIGS. 2 and 3 and the embodiment of FIG. 5 is that in the embodiment of FIG. 5 the sensed temperature of the utensil 2 is converted into a thermal signal (the ambient temperature within the housing 12), which affects the bi-metal strip 38' thermostatically rather than by direct mechanical action and which is superimposed upon the mechanical signal (the bending of the strip 38) produced by the passage of current through the bi-metal strip 38. In the embodiment of FIGS. 2 and 3 there is, in addition to the thermal signal, a mechanical signal (the position of the tip of the rod 30) which is superimposed upon the current-sensing signal.

In a typical installation approximately 90% of the physical movement of the contact 20 is controlled by the probe 16 and approximately 10% by the bi-metal strip 38.

Because the maintenance of the predetermined utensil temperature once that temperature has been obtained is controlled by a device (the device 18) which functions substantially independently of the temperature of the utensil 2, that maintenance of temperature may be accomplished with maximum accuracy, and, indeed, without any sensible change in the utensil temperature. This is to be contrasted with the conventional situation where the same device, sensitive to the temperature of the utensil, controls both the achievement of the predetermined temperature and the maintenance of that temperature. In this latter instance thermal and mechanical inertia require that there be an appreciable change in temperature within the utensil in order to actuate the switch from closed to open condition, or vice versa. Because the system of the present invention does not require any sensible change in the utensil temperature to produce a keep-warm function, thermal inertial can be entirely compensated for in the calibration of the adjusting knob 55 and shaft 48.

The device of the present invention achieves the above results by means of simply and easily assembled structure involving the use of conventional elements which are readily commercially available. Those elements are, however, structurally and operationally combined in a novel manner so as to achieve an accuracy which has not heretofore been possible except with exceedingly complex and expensive arrangements.

Because it is possible with the present invention to utilize a relatively insensitive temperature-sensing device 16 which may be capable of functioning over a wide range of temperatures for sensing the temperature of the utensil, and to utilize a much more sensitive device which relatively independently of the temperature of the utensil will produce the keep-warm function, it is practical to produce a utensil attachment according to the present invention which is truly applicable to all purposes, which may be used with one or selectively with a plurality of utensils to control temperature ranges extending from the relatively low temperatures involved in coffee percolation to the relatively high temperatures involved in frying, without any sacrifice in the accuracy at which any given selected temperature is achieved and maintained, and, in fact, with a more accurate retention of any temperature within this extended range than has heretofore been possible even with devices adapted to function only within more limited ranges. The device which controls the keep-warm cycling of the utensil after it has reached a predetermined temperature can be designed to produce any desired cycling characteristic, as by changing the resistance of the current-carrying part of the bimetal strip 38 so that more or less heat is developed therein for a given current flow therethrough, or by utilizing strips of different lengths and of different materials so that the degree of bend for a given temperature change will be increased or decreased. As a result the cycling function can be accurately tailored to the particular appliance with which the invention is adapted to be employed, or it may be so designed as to give satisfactory performance for a plurality of different types of utensils. This, it may be noted, can be accomplished without affecting the operation of the temperature-sensing device 16 which is directly thermally associated with the utensil.

While but a single embodiment of the present invention has been here disclosed, it will be apparent that many variations may be made, all within the scope of the instant invention as defined in the following claims.

This application is a continuation-in-part of my application Ser. No. 16,807 filed March 22, 1960, now abandoned, and having the same title as this application.

I claim:

1. An attachment for an electrically heated utensil comprising: a hollow housing adapted to be detachably secured to said utensil and having terminals adapted to make electrical connection with a heating element in said utensil, electric circuit means in said housing electrically connected between said terminals and an external source of power, a probe extending from the interior of said housing outwardly therebeyond and adapted to penetrate said utensil, a pair of movable arms mounted in said housing, spaced one above the other and carrying engageable contacts, manual means on said housing for adjusting the position of one of said arms, the other of said arms comprising a thermostatically bendable strip the thermostatic condition of which controls the position of the contact carried by said other of said arms, said contacts comprising a switch connected in said electric circuit means, said thermostatically bendable strip being operatively connected to said electric circuit means so as to be thermostatically affected by current flow in said circuit means, said probe being appreciably spaced from said thermostatically bendable strip being out of conductive thermal connection therewith, and being operatively thermally connected thereto substantially only via the open space inside said housing, the position of said thermostatically bendable strip varying in part in accordance with the ambient temperature of said open space inside said housing.

2. An attachment for an electrically heated utensil comprising: a hollow housing adapted to be detachably secured to said utensil and having terminals adapted to make electrical connection with a heating element in said utensil, a support in said housing having first and second sections, said first section comprising a support arm and said second section comprising a stack assembly, a probe secured to said support arm at a point spaced from said second section and extending from the interior of said housing outwardly therebeyond and adapted to penetrate said utensil, electric circuit means in said housing electrically connected between said terminals and an external source of power, a pair of movable arms mounted on said stack assembly, spaced one above the other, spaced from said support arm, and carrying engageable contacts, manual means on said housing for adjusting the position of one of said arms, the other of said arms comprising a thermostatically bendable strip the thermostatic condition of which controls the position of the contact carried by said other of said arms, said contacts comprising a switch connected in said electric circuit means, said thermostatically bendable strip being operatively connected to said electric circuit means so as to be thermostatically affected by current flow in said circuit means, said probe being appreciably spaced from said thermostatically bendable strip, being out of conductive thermal connection therewith, and being operatively thermally connected thereto substantially only via the open space inside said housing, the position of said thermostatically bendable strip varying in part in accordance with the ambient temperature of said open space inside said housing.

References Cited in the file of this patent

UNITED STATES PATENTS

| | | |
|---|---|---|
| 1,321,287 | Daly et al. | Nov. 11, 1919 |
| 1,431,542 | Ross | Oct. 10, 1922 |
| 1,916,498 | Spencer | July 4, 1933 |
| 2,847,553 | Smith | Aug. 12, 1958 |
| 2,903,552 | Jepson et al. | Sept. 8, 1959 |
| 2,936,359 | Sheahan | May 10, 1960 |
| 2,956,136 | Schwaneke | Oct. 11, 1960 |